Nov. 27, 1951  J. KOLBE  2,576,686
VEHICLE WITH COUNTER BANKING SUPERSTRUCTURE ON TURNS
Filed Jan. 24, 1947  7 Sheets-Sheet 3
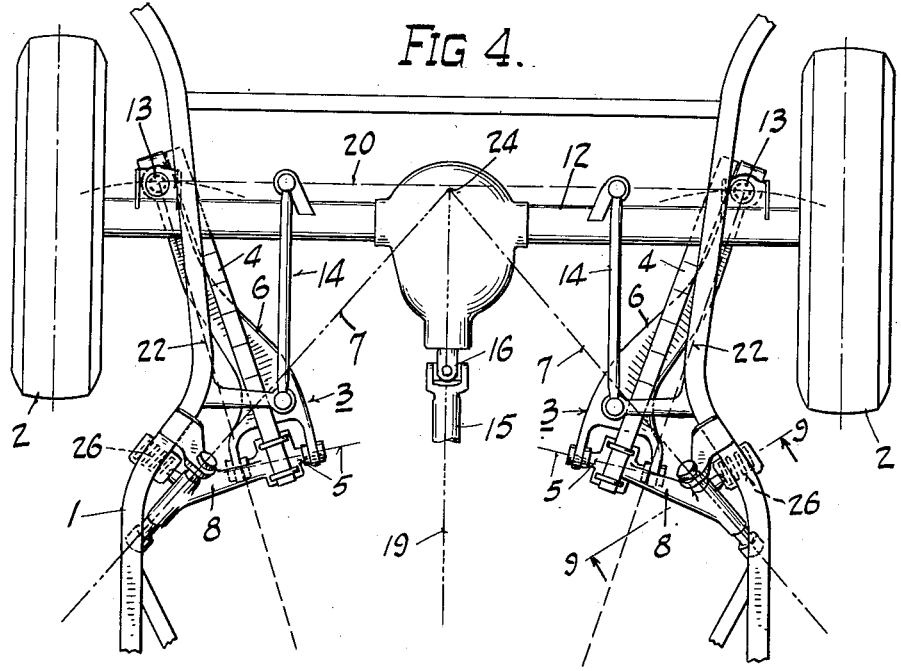
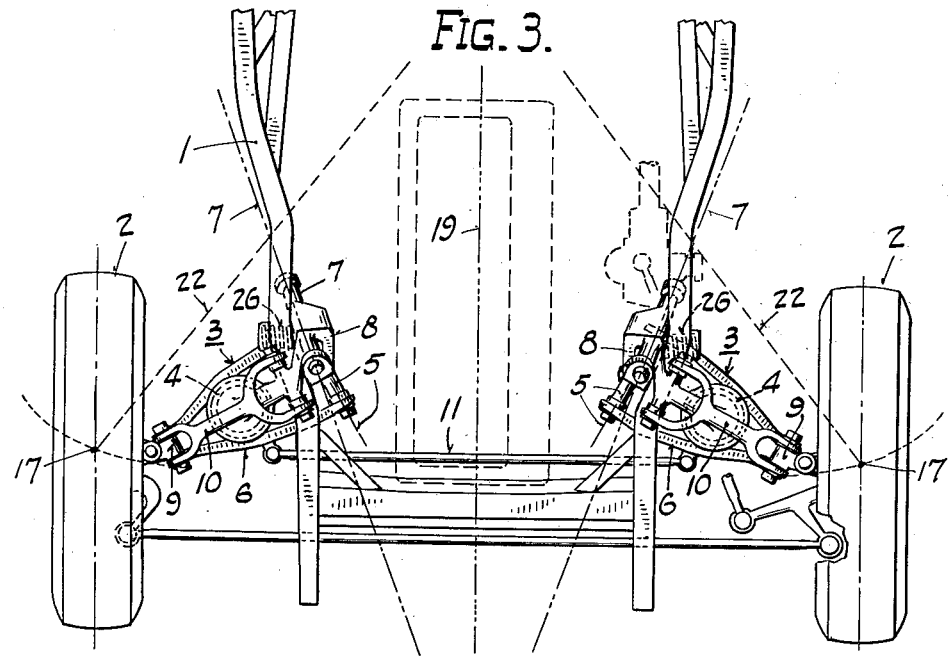
INVENTOR.
Joachim Kolbe
BY
ATTORNEY.

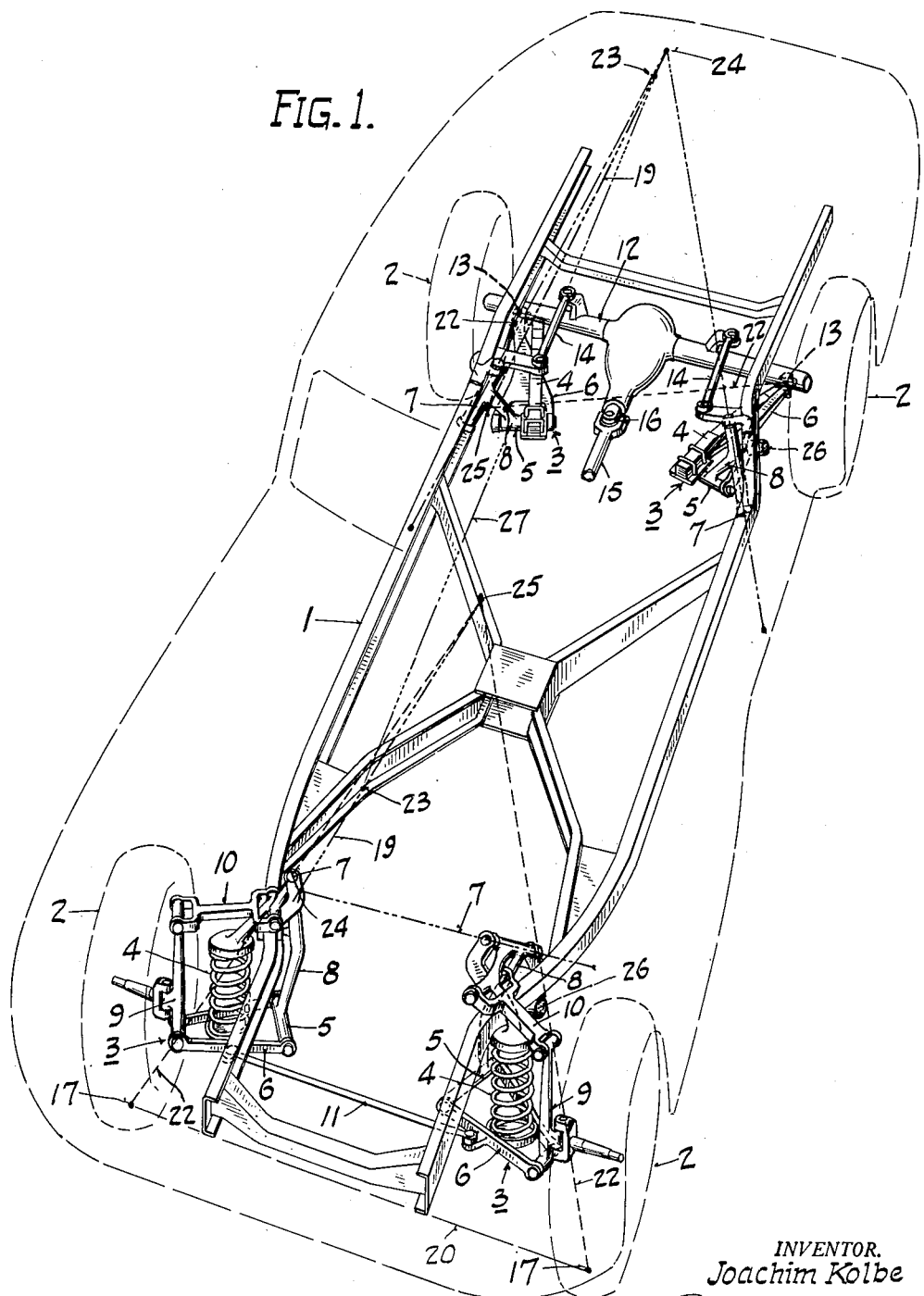

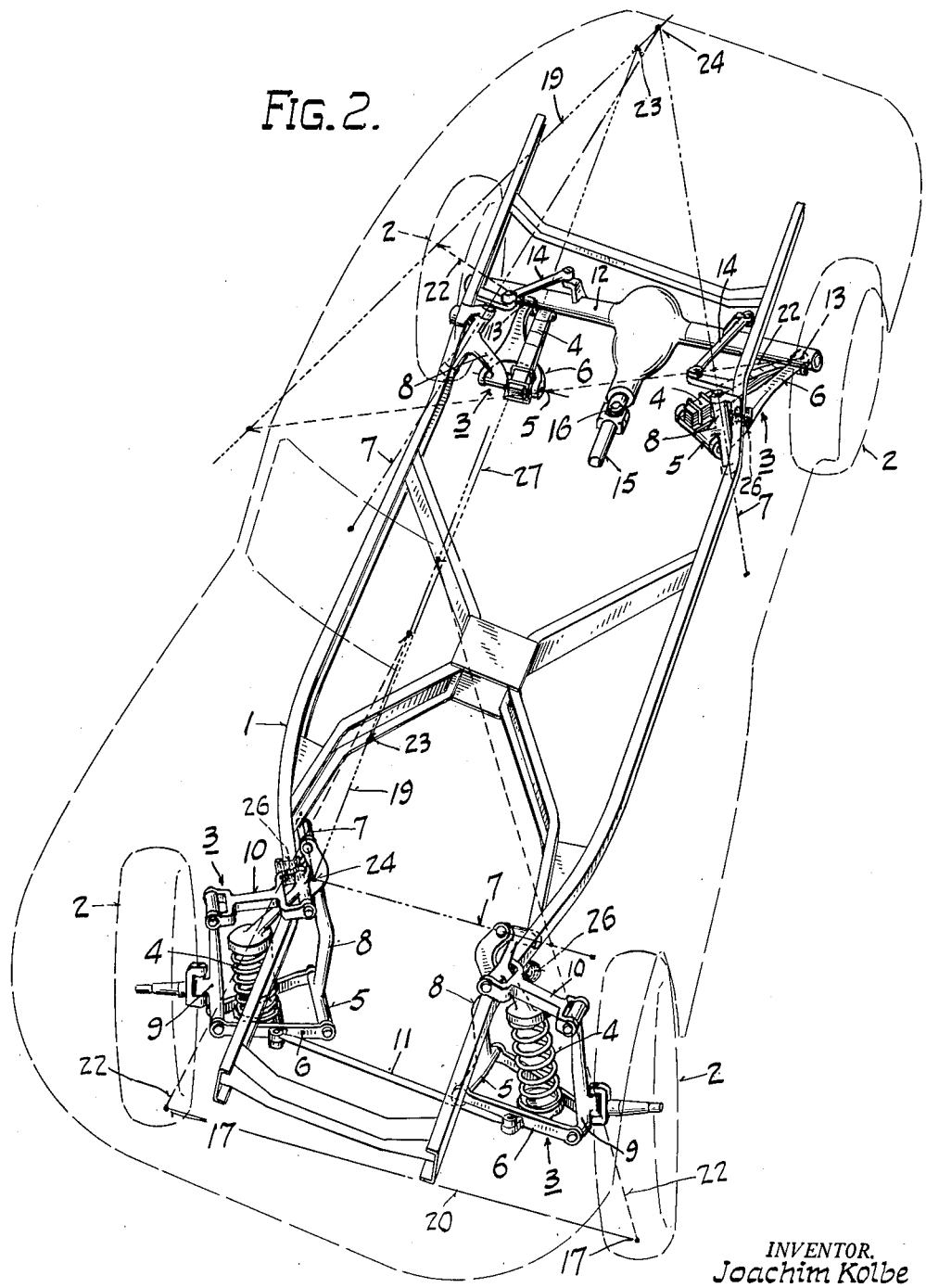

Nov. 27, 1951  J. KOLBE  2,576,686
VEHICLE WITH COUNTER BANKING SUPERSTRUCTURE ON TURNS
Filed Jan. 24, 1947  7 Sheets-Sheet 4
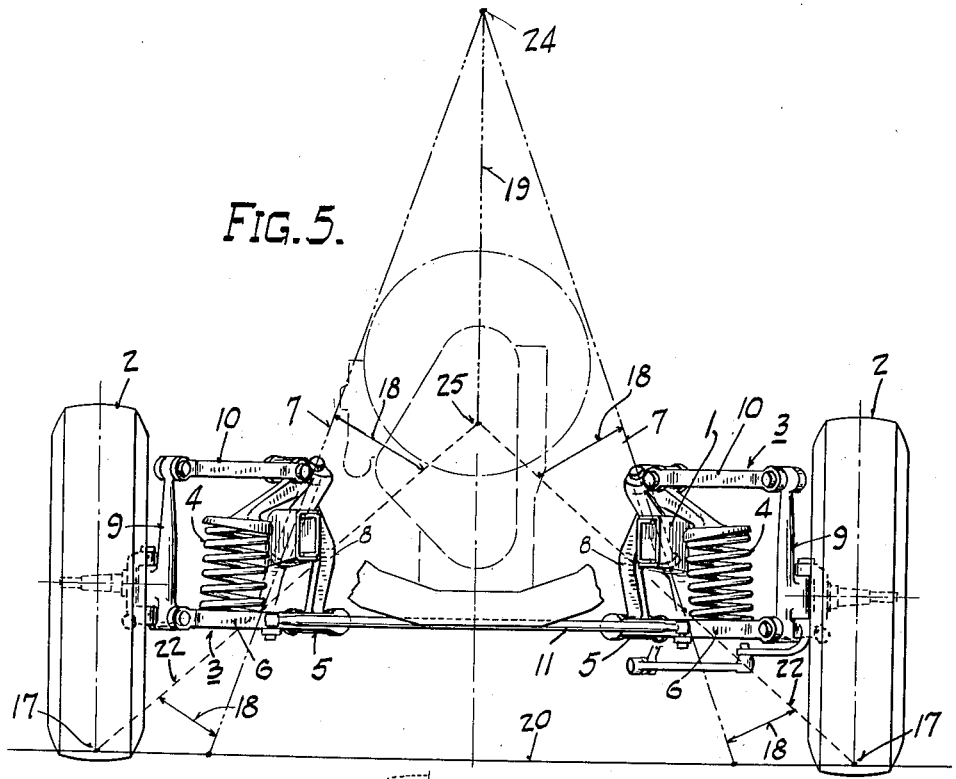
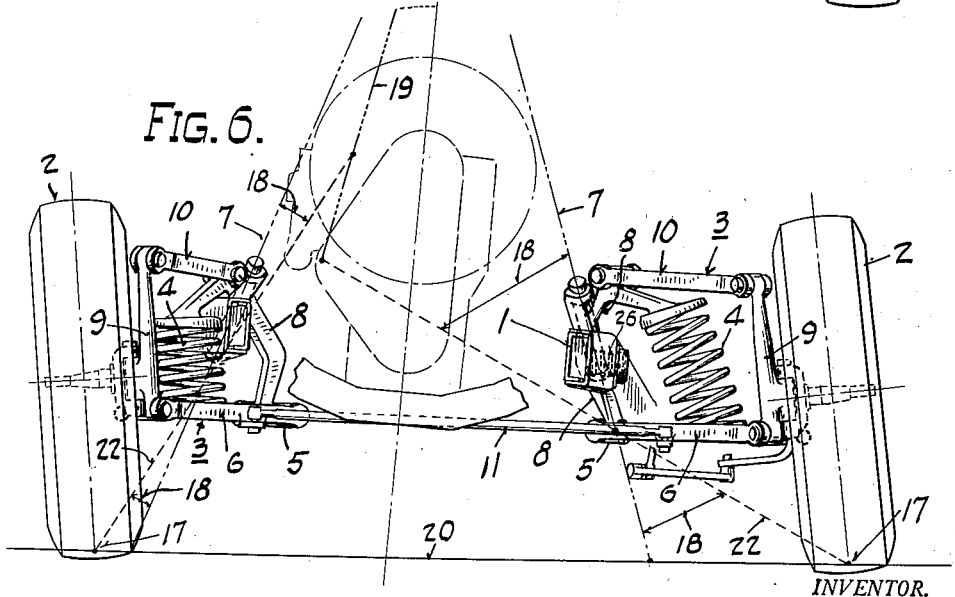
INVENTOR.
Joachim Kolbe
BY
ATTORNEY.

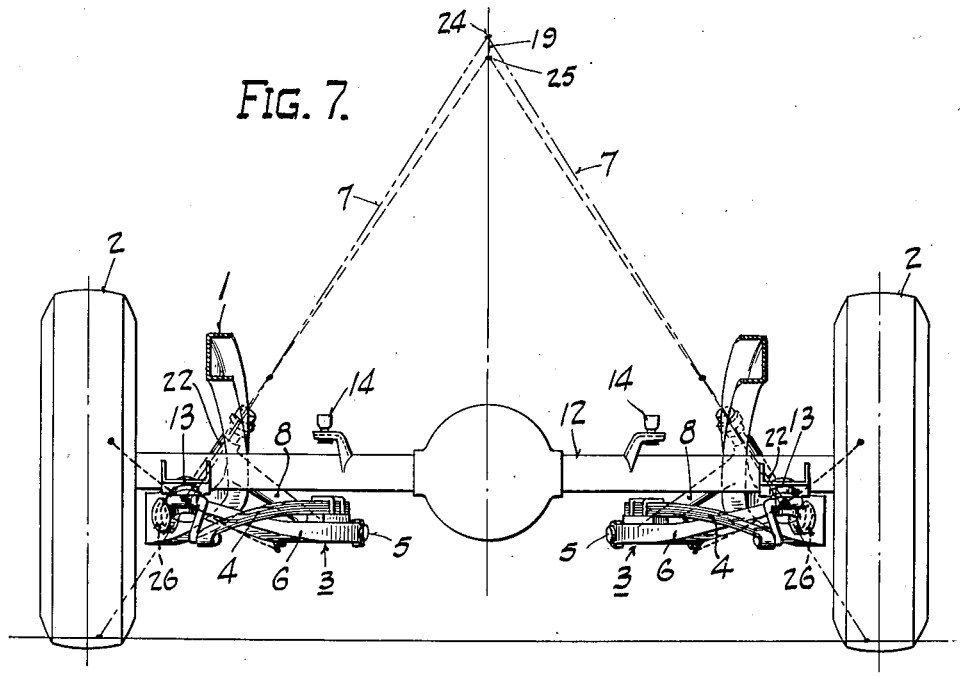
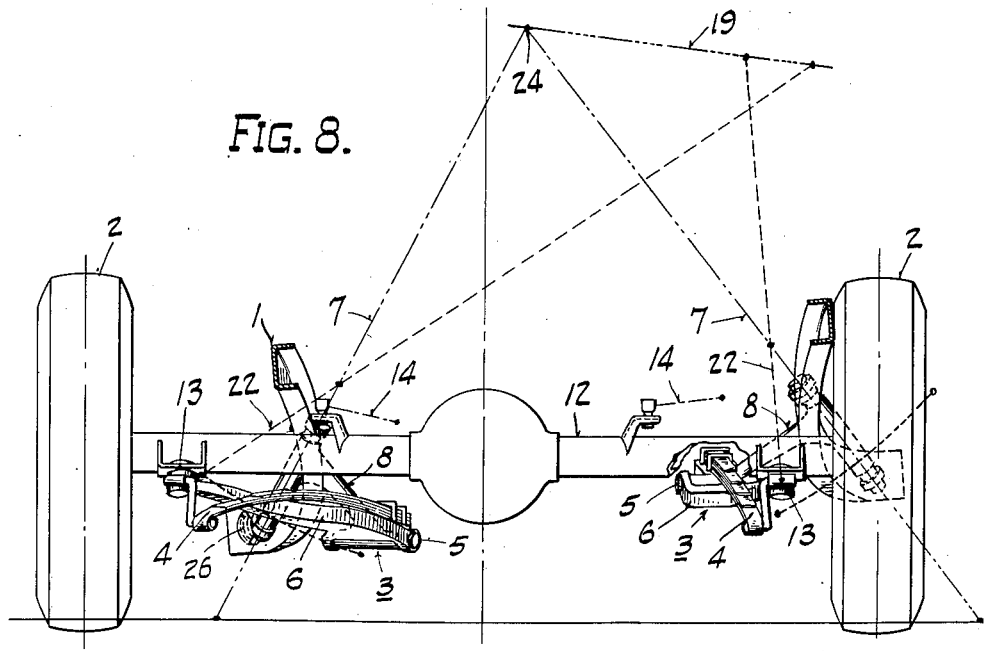

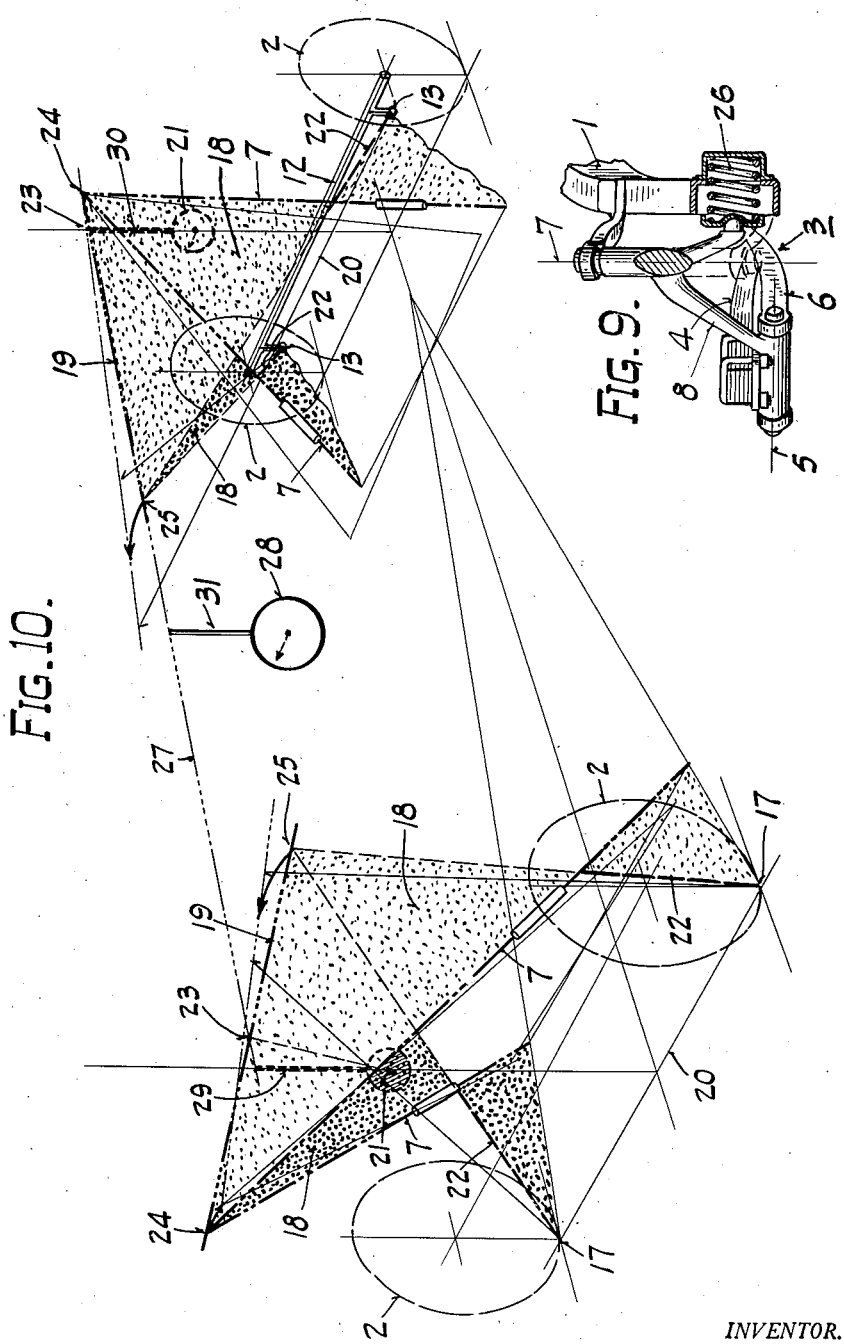

Nov. 27, 1951  J. KOLBE  2,576,686
VEHICLE WITH COUNTER BANKING SUPERSTRUCTURE ON TURNS
Filed Jan. 24, 1947  7 Sheets-Sheet 7

INVENTOR.
Joachim Kolbe
BY
ATTORNEY.

Patented Nov. 27, 1951

2,576,686

UNITED STATES PATENT OFFICE 2,576,686

VEHICLE WITH COUNTERBANKING SUPERSTRUCTURE ON TURNS

Joachim Kolbe, Milwaukee, Wis.

Application January 24, 1947, Serial No. 724,062

45 Claims. (Cl. 280—124)

This invention relates to a vehicle wherein the lateral forces developed by centrifugal action on the superstructure when rounding a turn are utilized to substantially prevent outward tilting of the superstructure and preferably to tilt or bank the superstructure toward the inside of the turn.

The invention is applicable to motor vehicle and railway car constructions and can be applied to trailer or articulated car construction where the connected units are mounted similarly.

By reason of the fact that most vehicle superstructures are generally supported by spring wheel carriers on opposite sides of the same providing for vertical oscillation of the wheels and which are attached to the superstructure at points substantially below the center of mass of the superstructure, the superstructure tends to tilt outwardly on turns and in doing so it rotates about a center zone of motion substantially below the center of mass.

Heretofore, it has been proposed to employ various link connections for supporting the superstructure upon a spring supported carriage member, whereby, upon lateral movement of the superstructure relative to the carriage member, the links cooperate to lift the superstructure relative to the carriage member on the side of the vehicle toward which the superstructure moves, and to lower the superstructure relative to the carriage member on the opposite side. Various illustrations of link mountings are disclosed in a number of patents granted to the present inventor. United States Patent Reissue No. 21,605 is referred to by way of example.

The present invention takes advantage of the fact that it is possible to eliminate the intermediate carriage members of link structures and to utilize a plurality of sets of wheel or axle carriers spaced longitudinally of the superstructure with their corresponding wheels disposed on opposite sides of the superstructure, and which carriers extend from the superstructure to the corresponding wheel or axle. Each carrier of a set of carriers constitutes at least a part of a corresponding banking arm of a pair of opposed banking arms. The banking arms of each pair extend from the superstructure to the road or axle, as the case may be, and are interconnected to force the superstructure to rotate about a center zone of motion substantially above the center of mass of the superstructure and into an inwardly banked position as the result of lateral shifting of the center of mass of the superstructure on a turn.

The construction of the present invention has a versatility in design for any given desired effect, not attainable with former link mountings. The mounting may be designed to function similar to the former link mountings with all of the advantages thereof. In addition it is possible to design the mounting to function more effectively than former link mountings with substantial advantages not attained heretofore.

One of the objects of the invention is to provide an inwardly banking vehicle mounting of substantially greater versatility in design, as described above, and which may fit into the general space requirements of present day vehicles without compelling displacement of the engine or seats and the like.

Another object of the invention is to greatly simplify an inwardly banking mounting by reducing the number and size of pivots and members required, thereby reducing the weight and cost and simplifying the transmission of brake forces and the steering.

Another object is to provide a correlation between the several sets of wheel carriers, particularly between the front and rear sets, that will produce a uniform banking effect and substantially avoid sub-steering.

Another object is to make possible the elimination of the generally upright links of former mountings and provide a lower support for the superstructure, permitting the employment of a lower center of mass of the superstructure with a resulting increase in safety.

Another object is to reduce the road clearance necessary between the superstructure and the road by avoiding substantial lowering of the superstructure during banking.

Another object is to design an inwardly banking mounting adaptable to either rigid axle or independent wheel suspension, and at the same time maintain the desired softness of the ride and guidance of the axle and wheels.

Another object is to provide an inwardly banking mounting which may be attached to the superstructure nearer to the center of the latter whereby the forces involved may be taken care of by a more rigid and strong frame member for the superstructure.

Another object is to provide a given inward banking effect with substantially less angular movement in the mounting.

Another object is to substantially reduce the wide lateral and vertical movements of the center zone of motion for the superstructure present in former link mountings and to make possible the simulation of a substantially free pendulum action for the superstructure in banking.

Another object is to reduce the spring forces necessary to govern the inward banking movement and to maintain the superstructure upright and stable when not banking.

Another object is to selectively control the resistance to the lateral movement of the superstructure for a given inward banking movement.

Another object is to provide an inwardly banking vehicle mounting which may be employed for any vehicle in which the superstructure generally shifts laterally relative to the wheels at a turn and the wheels remain substantially upright.

The principle of the mounting of the present invention stems from considering the problem as one of securing two superimposed rigid structures together in such a manner that when the upper one moves laterally relative to the lower one which is fixed, the moving one is turned a given amount in a given direction relative to the other. For independent wheel suspensions the road or earth constitutes the fixed rigid structure and the vehicle superstructure constitutes the movable one. For rigid axle suspensions the axle should be considered the same as the road and constitutes the fixed rigid structure while the superstructure is the movable one. The problem is further complicated by the necessity of supporting the movable structure upon the fixed structure and of providing relative vertical movement therebetween for the purpose of producing a soft ride for the vehicle.

The banking arms of the present invention serve the dual function of tilting the superstructure inwardly upon lateral movement of the same and of supporting the superstructure upon the road. For this purpose the banking arms may be considered as attached at one of the corresponding ends thereof to the superstructure or its equivalent and at the other of the corresponding ends to the road or its equivalent.

One of the physical characteristics that seems to be present in all banking arm constructions lies in the simplicity of construction and the general employment of an effective ball and socket joint or its equivalent at one end of the arm and a pivotal turning of the arm about an effective banking hinge line or axis at the other end.

In general, the banking hinge lines for the banking arms of each mounting will be disposed between the arms and the superstructure and will not change in direction relative to the superstructure and to each other under the influence of lateral forces. However, with rigid axle constructions it is possible to reverse the banking arms and to dispose the banking hinge lines between the arms and the axle provided that they do not change substantially in direction relative to the axle under the influence of lateral forces. A limited amount of change in direction of the banking hinge lines under the influence of vertical forces is permissible, as will be explained hereinafter.

The end of each banking arm opposite the banking axis is in effect a universally movable joint such as a ball and socket joint, and for rigid axle constructions it either connects the arm to the axle or to the superstructure, as the case may be. For independent wheel suspensions the effective universally movable joint for each arm is the center point for the road contact with the tire of the corresponding wheel.

The banking hinge lines should be disposed in a direction favorable to controlling the tilting of the superstructure when the latter causes turning at the hinge line as by lateral movement of the superstructure relative to the wheels.

In carrying out the invention, at least two sets of banking arms should be provided to support the superstructure, preferably one set at each end of the superstructure, with the banking arms of each pair of the set opposed to each other and spaced laterally on opposite sides of the superstructure. It is possible to employ a single wheel support for each banking arm, as in independent wheel suspensions, or to employ a rigid axle structure for one or more pairs of banking arms with one or more pairs of supporting wheels for the axle. If desired, one or more banking arms may be employed for each wheel provided that the resultant axis of rotation for the superstructure substantially coincides for all pairs of banking arms.

Each set of banking arms supporting the superstructure should provide substantially the same banking effect for the corresponding portion of the superstructure mass supported by it, as each of the other sets. For this purpose the axis of rotation for the superstructure resulting from the correlation of the several sets of banking arms should pass substantially above the center of gravity of the superstructure and provide a leverage for effecting the banking movement of the superstructure.

The invention may provide for the vertical oscillation of the wheels substantially separately from and without interference with the rotational movement about the corresponding banking hinge lines. For this purpose a spring or other suitable resilient cushion means may be employed to control the vertical oscillation of each wheel.

Where the construction is arranged to permit a lowering of the center of mass of the superstructure during banking, a spring member or its equivalent is employed to stabilize the position of the superstructure. Where the arrangement of elements effects a sufficient lifting of the center of mass during banking, the banking spring may be eliminated.

In constructing the mounting the plane for each banking arm (determined by the banking hinge axis line and a line drawn normal thereto from the center of the effective universally movable joint at the opposite end of the banking arm, which lines should be contained in the plane referred to) should intersect the corresponding plane for the opposite banking arm of a pair of interconnected arms in a line which represents the motion center line for the pair of arms, and which preferably passes over the effective center of mass being supported by the arms at a height substantially above said center. In determining the relative height of the effective center of mass referred to and the motion center line of the arms it is generally sufficient to consider the center of mass for that portion of the superstructure supported by the given pair of arms as being located directly above a straight line joining the outer ends of the arms.

Each pair of arms will have its corresponding motion center line. The leverage for the effective center of mass operative to produce turning at each corresponding motion center line is preferably the same to result in a substantially equal banking movement at both ends for the superstructure upon its axis of rotation for a given lateral movement of the superstructure and avoid sub-steering.

A more detailed description of the possible locations and selected angles for the banking hinge lines and axis of motion will be given hereinafter in the description of an embodiment of the invention as applied to an automobile illustrated in the accompanying drawings.

In the drawings:

Figure 1 is a perspective view of the running gear of the automobile;

Fig. 2 is a similar view showing the same structure when turning at a speed which exerts substantial centrifugal force upon the mass of the superstructure;

Fig. 3 is a top plan view of the front end structure of Fig. 1;

Fig. 4 is a similar top plan view showing the rear end structure of Fig. 1;

Fig. 5 is a front end elevation of the structure of Fig. 1;

Fig. 6 is a similar front end elevation of the structure shown in the position of Fig. 2;

Fig. 7 is a rear end elevation of the structure of Fig. 1;

Fig. 8 is a similar rear end elevation of the structure shown in the position of Fig. 2;

Fig. 9 is a detail section taken on line 9—9 of Fig. 4 and showing a suitable construction and mounting for the banking spring;

Fig. 10 is a schematic perspective view of the geometry of the mounting shown with the superstructure upright;

Figure 11:
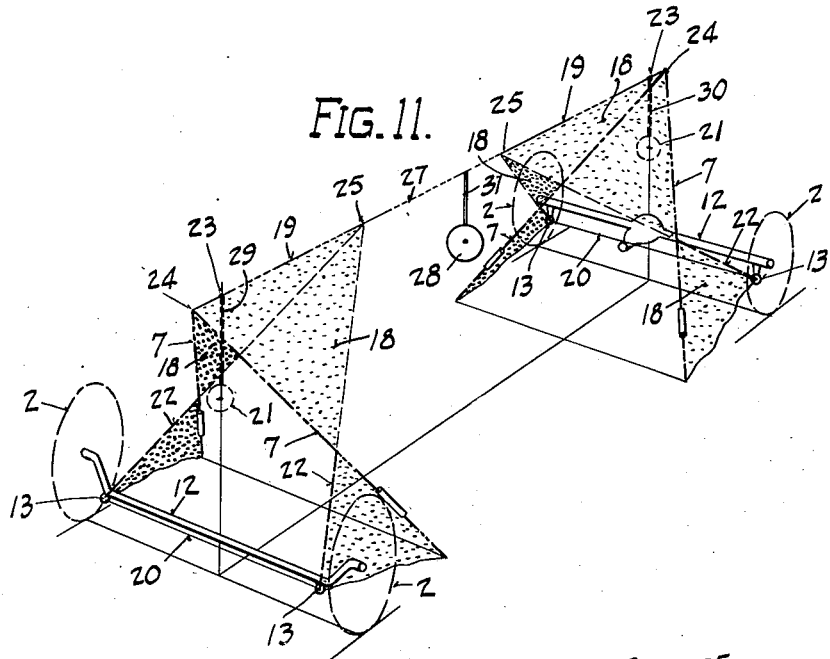
Fig. 11 is a similar schematic view of the geometry for a mounting employing rigid axles at both ends of the superstructure.

The present application is a continuation in part of the present inventor's application Serial No. 522,269, filed February 14, 1944, for Motor Vehicle, formally abandoned March 2, 1949, in favor of the present application. Reference is also made to copending applications Serial No. 635,268, filed December 15, 1945, for Vehicle, formally abandoned March 2, 1949; Serial No. 638,210, filed December 29, 1945, for Vehicle, now abandoned; Serial No. 641,707, filed January 17, 1946, for Vehicle, now abandoned; Serial No. 642,263, filed January 19, 1946, for Vehicle, now abandoned; Serial No. 642,264, filed January 19, 1946, for Vehicle, formally abandoned August 8, 1949; Serial No. 742,496, filed April 19, 1947, for Vehicle With Intercushioned Banking and Vertical Oscillation Suspension for the Superstructure; and Serial No. 23,066, filed April 24, 1948, for Inward Banking Vehicle With Shock Absorber Control; all of which illustrate various specific structures as exemplified in the earlier stages of development and application of the invention.

The mounting structure illustrated in the accompanying drawings comprises a superstructure I consisting of the chassis frame and body of a vehicle such as an automobile and all elements carried thereby, supported by a plurality of wheels 2 disposed in laterally spaced pairs on opposite sides of the superstructure and connected thereto by wheel or axle carriers 3.

Each pair of correlated carriers 3 constitutes a set, as referred to herein, by which one or more axles or pairs of wheels 2 are secured to the superstructure I. In the construction illustrated, two sets of carriers are employed, one at each end of the superstructure, and each set supports the superstructure upon a single pair of wheels 2 by means of the corresponding correlated carriers 3 therefor.

Any given set of carriers 3 may constitute either independent wheel suspensions or a suspension for a rigid axle structure supported directly by the wheels. In the construction illustrated, the front carriers 3 constitute independent wheel suspensions, and the rear carriers 3 constitute a rigid axle suspension.

The carriers 3 may constitute any practical type of wheel or rigid axle suspension providing the desired vertical oscillation for the wheels 2 relative to the superstructure I. For this purpose each carrier embodies a suitable cushion means 4.

In the construction illustrated, the vertical oscillation cushion means 4 for the front mounting consists of separate coil springs, and the means 4 for the rear mounting consists of separate leaf springs for the respective carriers 3. Each spring 4 is shown mounted to bridge a vertical oscillation horizontal pivot hinge line 5 for the carrier arm 6, and thereby control the vertical oscillation of the corresponding arm 6 and wheel 2 relative to the superstructure.

In carrying out the present invention in the manner illustrated, each wheel carrier 3 is connected to the superstructure I in a manner providing for relative pivotal movement therebetween upon a banking hinge line or axis 7. The structure of the connection is relatively unimportant, and it may consist of a pivotal hinge connection, as illustrated, or of a plurality of separate ball and socket type pivots disposed along the hinge line 7, or of link or cam structures and the like which restrict the carrier (except for its vertical oscillation) to a pivotal movement upon the axis 7, as described.

The drawings illustrate a convenient structure for providing the two hinge lines 5 and 7 by means of a hinge support 8 disposed between each oscillating arm 6 and the superstructure I. While the actual position of the hinge lines 5 and 7 may be interchanged, it is preferable to dispose the oscillating hinge 5 between the arm 6 and support 8 and to dispose the banking hinge 7 between the superstructure I and the support 8, as shown, in order to avoid a change in direction for hinge line 7 relative to the superstructure I upon vertical oscillation of the wheel 2.

The hinge lines 5 and 7 should be disposed near to each other to provide what might be called a limited or skew type of universal joint connection between the carrier arm 6 and superstructure I. The actual construction of the universal joint connection may vary so long as it provides definitely for the effective pivotal axes 5 and 7, as described, which control the vertical oscillation and banking movements required.

The lines 5 and 7 represent center lines for angular movement of the carriers 3 and constitute the resultants of any suitable form of connection which may embody various combinations of pivotal or hinge structures.

The opposite ends of each arm 6 should be spaced in plan view a substantial distance apart to provide the desired leverage for vertical oscillation in the case of arms having oscillation axes 5, and for turn at the banking axes 7.

Where the carriers 3 constitute independent wheel suspensions, the arms 6 may be pivoted horizontally at their outer ends to the corresponding immediate wheel supports which, in the front end construction illustrated, are the kingpin supports 9. A second arm 10 may extend above and substantially parallel to arm 6, and be pivoted to hinge support 8 and to the kingpin support 9 to provide a parallelogram action for controlling the caster and camber during vertical oscillation of the wheel.

Either the carrier arms 6, the supports 8, the kingpin supports 9 or the upper arms 10 for the set of arms should be tied together by a transverse tie rod 11 connected thereto by suitable universally movable joints to compel the carriers of any single set to function in correlation to each other and prevent undesirable change in the spacing of the road contact points for the wheels. Where the tie rod connections are attached to the oscillating mechanism as shown, the connections should be near to the level of the oscillation hinges 5 in order to minimize any interference with the vertical oscillation mechanism, and the springs 4 should be constructed to have a suitable spring rate for the entire banking arm mechanism.

Where a rigid axle suspension system is employed, as illustrated for the rear end mounting, the outer end of arms 6 may be connected to the axle or axle housing 12 by suitable universally movable joints in the form of the ball and socket joints 13, and the axle housing 12 serves as the tie rod to compel the carriers to function in correlation to each other. One or more radius rods 14 link the housing 12 to the superstructure and provide for securing the housing against brake forces and the like. The drive shaft 15 should connect to the differential through suitable universal joints 16 to provide for free lateral movement of the superstructure relative to the axle housing 12.

In carrying out the invention the banking arm should be considered as existing between the banking hinge line 7 and the road or its equivalent. For independent wheel suspensions the banking arm includes the entire carrier and wheel structure from the banking hinge line 7 to the center 17 of the road contact of the corresponding wheel 2. For rigid axle systems the axle may be considered equivalent to the road and the banking arm then extends from the superstructure (usually the banking hinge line 7) to the axle connection for the arm (usually the center of the corresponding joint 13).

The movement for the points of road contact 17 and 13 in plan view relative to the superstructure resulting from lateral shifting of the superstructure during banking is indicated in Figs. 3 and 4 by the dash arcuate lines passing therethrough. Substantially no sub-steering occurs in the rear mounting of Fig. 4. A limited amount of sub-steering occurs in the front mounting of Fig. 3 and is compensated automatically by the steering mechanism.

The plane 18 for the banking arm in each instance is the plane containing the banking hinge line 7 and either the road contact center 17 or the joint 13, as the case may be.

The two planes 18 for any given pair of arms should intersect in a line 19 which may be called the motion center line for the arms and which at all times preferably passes above the level of the effective center of mass for the corresponding portion of the superstructure being supported by the arms when the line 19 passes over the effective road line 20 joining the outer ends of the arms. For this purpose, the mass of the superstructure being supported by a given pair of arms may be considered as centered directly over the effective road line 20, and the effective center of the mass may be represented by point 21 located directly above the road line.

The road line 20 for any independent suspension mounting may be considered generally as the straight line passing through the road contact points 17 for the wheels 2 of the mounting, and in the case of a rigid axle system the equivalent road line 20 may be considered as the straight line connecting the outer ends of the arms, and which in the illustration passes through the ball and socket joints 13 that constitute the effective road contact points with the corresponding banking arms.

The hinge lines 7 for a mounting may be located at any angle so long as the resulting motion center lines 19 for the several pairs of arms provide an average leverage for the center of gravity of the superstructure to effect banking. In general, the most favorable angle for the banking hinge line 7 will depend upon the location for the connection between the banking arm and the superstructure.

The banking hinge line 7 should not lie in either the longitudinal or the transverse vertical plane passing through the center of road contact 17 or of the joints 13.

The actual pivotal connections between the carriers 3 and the superstructure may be located anywhere along the corresponding banking lines 7 that is found most convenient from a space and cost standpoint.

In the construction illustrated the hinge supports 8 for the front mounting are located rearwardly of road line 20 and inwardly from the points 17, and the hinge supports 8 for the rear mounting are located forwardly of the equivalent road line 20 and inwardly from joints 13.

Where the hinge supports 8 are disposed either forwardly or rearwardly of the road line, as shown, it is preferable to vary the angle of the hinge lines 7 from the horizontal and to dispose each line 7 somewhat tangential to a corresponding arc in the plane of the banking arm and having the road contact point 17 or the equivalent joint 13 as its center. The radius 22 of the arc normal to the hinge line 7 represents the effective length of the banking arm and the leverage of the same in pivotal movement at the corresponding hinge line. Since the cushion means 4 is contained within the banking arm as shown, the length of the banking arm represented by line 22 will change during banking due to movement at the oscillating hinge line 5 resulting in a movement for spring 4.

Where the banking hinge lines 7 for any pair of banking arms approach the substantially parallel and horizontal position they may be considered as meeting at infinity and should be disposed relatively high above the road line 20 so that motion center line 19 will remain at all times above the center of mass 21 for the superstructure. In this construction the motion center line 19, at the point or points of intersection therewith of lines 22 extended, moves laterally with lateral movement of the center of mass 21 and downwardly with a substantially greater distance of movement than for the corresponding center of mass 21.

The movement of the motion center line 19 at the point 23 thereon nearest the mass center 21 governs the movement for the latter at all times. In general, too sharp a lowering of line 19 at point 23 and of mass center 21 on a sharp turn will produce an undesirable reduction in road clearance.

The two banking hinge lines 7 for each pair of banking arms preferably lie in a common plane of their own and the banking lines should form the sides of a triangle with the road as a base and with the apex 24 lying in the motion center line 19. In very exceptional cases, as where a turn in only one direction is to be encountered or where space requirements for the particular vehicle necessitate a different location for one hinge connection, will it be desirable to consider offsetting the banking hinge lines 7 from each other in their angular position from the horizontal.

Likewise, the banking arm lines 22 preferably lie in a common plane of their own when the superstructure is upright and form the sides of a triangle with the road line 20 as a base and the apex 25 lying in the motion center line 19. Where the banking hinge lines 7 are offset from each other, as explained above, the lines 22 may be offset correspondingly and may not meet at point 25 when the superstructure is upright.

During the banking movement of the superstructure the triangle for the banking hinge lines 7 rotates while that for the banking arm lines 22 becomes distorted and disappears.

One of the advantages of the present invention lies in the ability to provide a mounting which is more stable and in which the motion center line 19 has a substantially neutral or quiet point 23 nearest to the effective center of mass 21 and which does not move substantially during lateral movement of the superstructure.

This may be accomplished in several ways. One is to dispose the banking axes 7 for a given pair of arms at an angle which will locate apex 24 near to point 23 on line 19. Another is to dispose the banking axes 7 for a given pair of arms at an angle which will locate apex 24 on the opposite side of point 23 from apex 25 and generally sufficiently above the level of point 23 to cause a rotational movement for apex 24 about point 23 substantially compensating the corresponding movement for the intersections of lines 22 with line 19 (designated as apex 25 when the superstructure is upright) in the opposite direction during banking.

The undesirable vertical drop of the center of mass during banking may be eliminated altogether, and if desired, the center of mass may be raised during banking, thereby maintaining road clearances and the like.

Where each banking hinge line 7 passes between the corresponding road point 17 or its equivalent 13 and motion center line 19, as by pointing the hinge line upwardly inwardly and over the road line 20, the construction of the mounting is of the overslung type generally resulting in movement of line 19 at point 23 laterally to the same side as the movement of the center of mass 21.

Where each road point 17 or its equivalent 13 is disposed between the corresponding banking hinge line 7 and motion center line 19, as by pointing the hinge line downwardly outwardly and under the road line 20, the construction of the mounting is of the underslung type generally resulting in movement of line 19 at point 23 laterally to the opposite side from the movement of the center of mass 21.

The overslung and underslung constructions explained above are reversed where the banking arms 6 are reversed as is possible for rigid axle suspensions when the banking hinge lines 7 are disposed between the arms 6 and the axle instead of between the arms 6 and the superstructure.

By employing skew banking hinge lines (i. e. disposed at an angle to the longitudinal median plane of the vehicle and between the horizontal and vertical positions) with the banking connections either forwardly or rearwardly of the road line 20 or its equivalent, it is possible to substantially reduce the lateral movement of motion center line 19 at the point 23 nearest the center of mass 21 and to prevent substantial vertical movement of the point.

Where point 23 moves laterally with and at the same speed as the center of mass 21 the latter will remain at the same level at all times during banking. Where point 23 moves laterally with the center of mass 21 at a greater speed than for the mass, there will be a corresponding gradual lowering of the center of mass. Conversely, where point 23 moves laterally with the center of mass and at a slower speed than for the mass, there will be corresponding gradual raising of the center of mass. Where point 23 has either an up or down vertical component of motion during its lateral movement there may be a corresponding drop or lift for the effective center of mass 21.

The angular movement effective at each banking hinge line 7 is controlled by a banking spring 26 which is mounted in any suitable manner to bridge the hinge line. The springs 26 for any given pair of banking arms are opposed to each other and serve to keep the superstructure substantially centered and upright under minor conditions of load unbalance when the vehicle is standing still or traveling on a straight road.

The relatively small angular movement at the banking hinge lines 7 in order to achieve the full desired banking effect makes it possible to employ springs 26 within the space requirements of an automobile and within commercial limits of spring capacity for the purpose.

A preferable angular direction for the banking hinge lines 7, depending upon the location of the banking connection, is somewhat less than about 45° to the horizontal and about 45° to the longitudinal vertical plane containing the two effective centers of mass 21.

If hinge lines 7 are disposed too near to a vertical position, the geometry of the mounting will result in very little banking, if any. This is because the motion center line 19 for such a mounting approaches the vertical and results in very little vertical component of movement between the road and the superstructure as the result of lateral movement of the latter.

The angle of motion center line 19 should be less than 45° to the horizontal, and it is desirable to provide a substantially horizontal line 19 for rigid axle suspensions in order to prevent substeering.

The motion center line 19 for the front set of banking arms illustrated slants forwardly and upwardly at an angle of about 25° from the horizontal and passes over the road line 20 at a height substantially above the center of mass 21 at the front end of the superstructure.

The motion center line 19 for the rear set of banking arms illustrated is nearly horizontal and passes over the effective road line 20 at a height substantially above the center of mass 21 at the rear end of the superstructure.

In considering the mounting as a whole, the several sets of banking arms should be correlated to provide substantially the same banking effect for a given amount of lateral movement of the superstructure. One way of accomplishing correlation is to compel it by a mechanical interlock between the front and rear sets of banking arms as shown in the copending application Serial No. 641,707 referred to above.

In the structure illustrated in the present application the front and rear sets of banking arms are correlated in design by providing substantially the same leverage or pendulum arm for operation of the two sets.

A line 27 drawn between the front point 23 and the rear point 23 on the corresponding front and rear motion center lines 19 constitutes the resultant axis of rotation for the superstructure 1 during banking.

The axis of rotation 27 established for the superstructure 1 by the two sets of banking arms should be at all times a substantial distance above the center of gravity 28 for the superstructure to provide a substantial lever arm for the mass of the superstructure to effect rotation of the latter to a banked position upon lateral movement of the center of gravity thereof.

On the other hand, the axis of rotation 27 for the superstructure should not be so high that the angular movement desired for banking requires too large a lateral movement of the center of gravity 28. In most passenger automobiles a leverage of about 15 inches for the center of gravity 28 against the axis of rotation 27 will be found to be adequate.

The leverage operative to produce banking of the superstructure at its forward end is represented by a line 29 drawn from the effective center of mass 21 at the front normal to the axis of rotation 27. Likewise, the leverage operative to produce banking of the superstructure at its rear end is represented by a line 30 drawn from the effective center of mass 21 at the rear normal to the axis of rotation 27.

The length for lines 29 and 30 should be substantially equal where the effective front and rear mass centers 21 are at the same level. The pendulum arm 31 for the center of gravity 28 in effecting banking of the superstructure is then equal to lines 29 and 30.

The axis of rotation 27 may vary a few degrees from horizontal where some sub-steering is permissible. However, it is preferable to maintain the axis 27 substantially horizontal at all times.

Where one effective center of mass 21 is at a different level than the other the substantially horizontal axis of rotation 27 should be disposed substantially above the center of gravity 28 at all times and preferably above both of the effective centers of mass 21. The pendulum arm 31 extending from the center of gravity 28 to the axis 27, at right angles to the latter, then has a length intermediate the lengths of lever arms 29 and 30. Where the end of the superstructure which has the higher effective center of mass 21 is relatively light as compared to the opposite end, it is possible to obtain banking for the superstructure even though a negative lever arm 29 or 30 is provided for the lighter end.

Each set of banking arms should be designed in correlation to the others to provide for substantially the same movement for the respective points 23 during banking, so that the axis of rotation 27 for the superstructure will remain substantially parallel to its initial position at all times and to the longitudinal center line of the superstructure.

In general, for most passenger automobiles the angular banking movement for the superstructure need not exceed about 10° of banking, and usually will be satisfactory in the range of from 2° to 8°. For heavy busses, trucks, railway cars, and the like, the angular movement in banking may not exceed about 5°, and usually will be satisfactory if substantially less than that. Even a 0° banking movement which keeps the superstructure upright against tilting to the outside of a turn is a substantial improvement over present day vehicle construction. The term "counterbanking" as used hereinafter in the claims and elsewhere is intended to mean an improvement wherein the superstructure leans less to the outside or actually banks inwardly on turns, as described above.

Where the vehicle is self-steering as in the case of an automobile, sub-steering by reason of the angular movement of the banking arms relative to the superstructure should be avoided unless compensated. The problem of compensation does not arise with rigid axle mountings provided that the motion center lines 19 are substantially horizontal. For independent wheel suspensions it is desirable to compensate for the sub-steering effect of banking by providing a turning of the wheels on their corresponding kingpins in correlation to the banking action, as set forth in copending application Serial No. 642,263, referred to above.

Similarly, where independent wheel suspensions are employed in a self-steering vehicle, the mounting should be designed to compensate for undesirable changes in caster or camber of the wheels resulting from the banking action. The changes in caster and camber permissible will depend upon the type of wheel carrier suspension employed. With some it is desired to prevent any change in either caster or camber as a result of banking. In the construction illustrated there is some change in both caster and camber. The specific structure illustrated having about a 45° banking hinge line may be changed to provide more change in caster and less in camber by establishing the angular position for the motion center line 19 either more toward the vertical or the horizontal, or it may be changed to provide more change in camber and less in caster by establishing the angular position for the motion center line 19 more toward the horizontal and away from the vertical.

The mounting improves the capacity for vertical oscillation of the wheels where diagonal road unevenness is encountered, and thereby reduces the range of vertical oscillation which otherwise would have to be provided for in the carriers 3.

The invention makes possible the use of a reasonably short pendulum-like arm length between the axis of rotation 27 and the center of gravity 28 so that the desired angular banking movement of the superstructure can be attained with a relatively small lateral movement, and without danger of instability. Furthermore, the invention makes possible the control of movement of the axis of rotation 27 during banking so that it does not lower relative to the center of gravity 28 to a point of danger from insufficient road clearance and the like.

The forces necessary to resist turn at the banking hinge lines 7 and to bring the superstructure back to its central upright position, are substantially less than the forces required in former link constructions to hold the superstructure upright.

In the present invention there appears to be a pendulum-like action by the mass of the superstructure in swinging around the axis of rotation 27 where the axis is established by the design of the mounting to move very little, a minimum of only a little more than the distance required of the center of gravity 28 of the superstructure to compress the cushion means 4 on the outside of the turn.

During the banking movement the relatively light springs 26 are fully compressed early and thereafter remain ready to right the superstructure when the lateral centrifugal forces cease.

Figure 12:
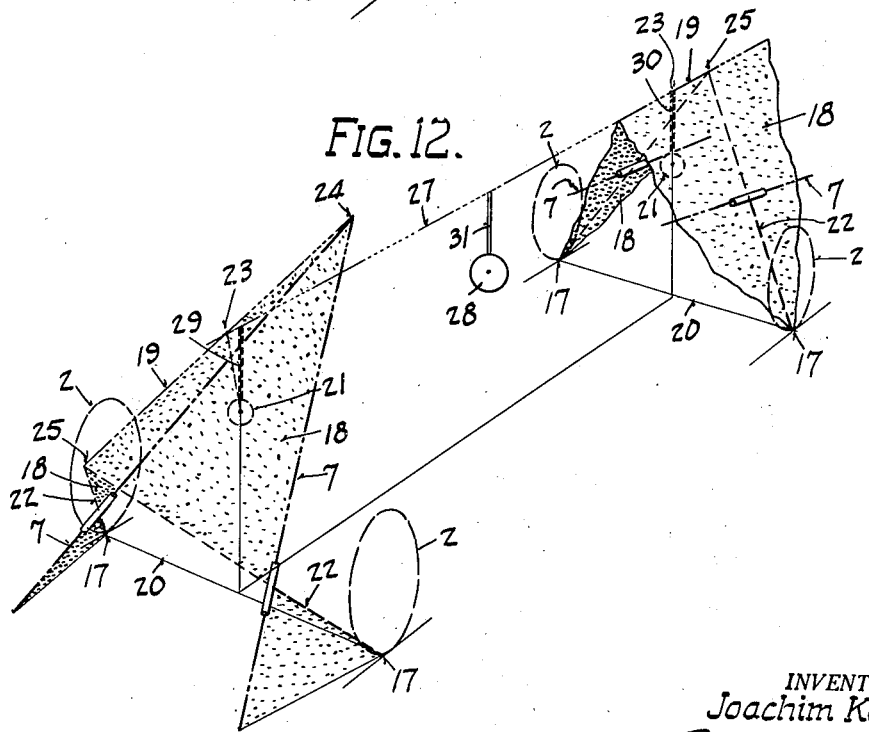
Fig. 12 is a similar schematic view of the geometry for a mounting employing independent wheel suspensions at both ends of the superstructure.

Referring to Figs. 10, 11 and 12, which illustrate the geometry of the invention, it is pointed out that Fig. 10 shows the geometry substantially applicable to the specific structure illustrated in Figs. 1 to 9. Fig. 11 shows a typical geometry for a vehicle employing rigid axles in both the front and the rear. Fig. 12 shows a typical geometry for a vehicle employing independent wheel suspensions in both the front and the rear. In all three illustrations the principles of the mounting are the same.

The arrows shown in Fig. 10, running from points 24 and 25 on the corresponding motion center lines show the general relative direction of movement for the corresponding points during banking of the superstructure as the result of a lateral movement corresponding to that indicated by the arrows for the mass centers 2f and the center of gravity 28.

The relative shifting and distortion of the triangles enclosed by the banking hinge lines and those enclosed by the banking arm lines during banking, is shown by light full lines near their original positions in Fig. 10.

Unless sub-steering is compensated for, as by manual steering mechanism, it is well to have the motion center lines 19 substantially coincide with the axis of rotation 27 in the central non-banked position of the superstructure.

Where the motion center lines 19 for the front and rear do not coincide, or where they move differently during banking, the design should be such that the oscillation springs 4 serve to compensate for the differences involved and to correlate the same to provide a common resultant axis of rotation 27 which remains substantially horizontal and substantially parallel to the longitudinal center line of the superstructure and above the center of gravity of the superstructure at all times.

One of the characteristics of the invention where the banking axes are fixed relative to the superstructure lies in the improved leverage ratios for the banking arms, wherein the leverage for each arm is fulcrumed on the banking axis therefor as distinguished from being fulcrumed on the effective point of road support therefor. The resilient means associated with each banking arm effectively controls the lever movement thereof to establish the fulcrum in the manner described.

A vehicle banking arm as employed in this specification and in the claims is defined as that part of the supporting structure of a counter-banking vehicle constituting one of at least a pair of interconnected supports between the superstructure and either the road or a rigid axle, comprising a universally movable joint at one end guided in its banking movement relative to the opposite end of the arm structure in effect by an inclined hinge at said opposite end to thereby move along a predetermined path whereby the plane of the arm containing the center of the universally movable joint and the inclined hinge axis intersects the median vertical longitudinal plane of the superstructure in static position in a line passing substantially above the center of gravity of that part of the superstructure supported by said pair of supports at the point of intersection of the line with a transverse vertical plane containing the universally movable joints of the pair of supports, said banking arm structure constituting also the vertical oscillation mechanism for guiding the superstructure for vertical oscillation upon the road or rigid axle, and said universally movable joint being furnished by the tire to road contact in the case of an independent wheel suspension.

There are many different embodiments of the invention possible depending upon the type and design of carrier construction employed and the degree of banking desired.

I claim:

1. A vehicle comprising a superstructure adapted to counter-bank on turns, a plurality of sets of banking arms disposed to support said superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, and means interconnecting the banking arms of each pair to retain said effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

2. A vehicle comprising a superstructure adapted to counter-bank on turns, a plurality of sets of independent wheel carriers disposed to support said superstructure and spaced longitudinally of the same, each set of carriers together with the wheels associated therewith constituting at least a pair of opposed banking arms spaced laterally apart on opposite sides of the longitudinal center line of the superstructure and extending from the superstructure to the road with the connections for each pair of banking arms to the superstructure embodying in effect a pivotal banking axis for each arm, and means interconnecting the banking arms of each pair to retain the wheels for the corresponding pair in substantially constant spaced relation at the corresponding center points of road contact therefor, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

3. A vehicle comprising a superstructure adapted to counter-bank on turns, a plurality of transversely disposed rigid axle structures spaced longitudinally of the superstructure for supporting the same on the road, a set of axle carriers for each axle structure extending between the same and the superstructure for supporting the latter on the axle structure, each set of axle carriers constituting at least a pair of opposed banking arms spaced laterally apart on opposite sides of the longitudinal center line of the superstructure with the connections for each pair of banking arms to the superstructure and corresponding axle structure embodying in effect a universally movable joint at one corresponding end of each arm and a skew pivotal banking axis at the other end of each arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and additional means connecting the rigid axle structure to the superstructure and disposed to determine the rotational position of the axle structure at all times in cooperation with said banking arms.

4. A vehicle comprising a superstructure adapted to counter-bank on turns, a plurality of transversely disposed rigid axle structures spaced longitudinally of the superstructure for supporting the same on the road, a set of axle carriers for each axle structure extending between the same and the superstructure for supporting the latter on the axle structure, each set of axle carriers constituting at least a pair of opposed banking arms spaced laterally apart on opposite sides of the longitudinal center line of the superstructure with the universally movable connection thereof disposed between each banking arm and its corresponding axle structure and with the connection between each arm and the superstructure embodying a skew banking axis, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and additional means connecting the rigid axle structure to the superstructure and disposed to determine the rotational position of the axle structure at all times in cooperation with said banking arms.

5. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

6. A vehicle comprising a superstructure adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

7. A vehicle comprising a superstructure adapted to counter-bank on turns, a plurality of sets of banking arms disposed to support said superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, means interconnecting the banking arms of each pair to retain said effective universally movable joints for the corresponding pair in substantially constant spaced relation, and resilient means disposed to resist turning movement at the banking axes of said arms and thereby retain the superstructure upright on said banking arms when free from lateral forces, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

8. A vehicle comprising a superstructure adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, means interconnecting the banking arms of each pair to retain said effective universally movable joints for the corresponding pair in substantially constant spaced relation, and resilient means associated with each banking arm disposed to provide for relative vertical oscillation between the superstructure and the point of effective road support for the corresponding banking arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

9. A vehicle comprising a superstructure adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the connection between each said banking arm and the superstructure embodying in effect a skew banking axis, means connecting the banking arms of each said pair to retain the outer ends of the same in substantially constant spaced relation, and resilient means disposed to provide for vertical oscillation of the outer end of each banking arm substantially independently of pivotal movement at the banking axis, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

10. A vehicle comprising a superstructure, adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, means interconnecting the banking arms of each pair to retain said effective universally movable joints for the corresponding pair in substantially constant spaced relation, resilient means disposed to resist turning movement at the banking axes of the arms and thereby retain the superstructure upright on said banking arms when free from lateral forces, and resilient means associated with each banking arm to provide for relative vertical oscillation between the superstructure and the point of effective road support for the corresponding carrier, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

11. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, resilient means disposed to resist turning movement at the banking axes of the arms and thereby retain the superstructure upright on said banking arms when free from lateral forces, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

12. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, resilient means associated with each carrier to provide for relative vertical oscillation between the superstructure and the point of effective road support for the corresponding carrier, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

13. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, resilient means disposed to resist turning movement at the banking axes of the arms and thereby retain the superstructure upright on said banking arms when free from lateral forces, resilient means associated with each carrier and disposed to provide for relative vertical oscillation between the superstructure and the point of effective road support for the corresponding banking arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

14. A vehicle comprising a superstructure adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, resilient means disposed to resist turning movement at the banking axes and thereby retain the superstructure upright on said banking arms when free from lateral forces, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

15. A vehicle comprising a superstructure, adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, resilient means associated with each carrier and disposed to provide for relative vertical oscillation between the superstructure and the point of road support for the corresponding banking arm, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

16. A vehicle comprising a superstructure adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on oposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, resilient means disposed to resist turning movement at the banking axes and thereby retain the superstructure upright on said banking arms when free from lateral forces, resilient means associated with each carrier and disposed to provide for relative vertical oscillation between the superstructure and the point of effective road support for the corresponding banking arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

17. A vehicle comprising a superstructure adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, each of said banking arms being articulated to provide for vertical oscillation of one end relative to the other upon an effective oscillation pivotal axis which is substantially horizontal and near to the connection between the corresponding banking arm and the superstructure, resilient means disposed to bridge said oscillation axis and thereby control the articulation of each corresponding banking arm, and means interconnecting the banking arms of each pair to retain the effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

18. A vehicle comprising a superstructure adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, each of said banking arms being articulated to embody a hinge support at the end carrying the banking axis and an oscillating arm connected to said support to oscillate vertically relative thereto upon an effective pivotal axis therebetween which is substantially horizontal and near to the connection between the corresponding banking arm and the superstructure, resilient means disposed between said hinge support and oscillating arm to control the vertical oscillation of the outer end of the arm relative to the superstructure, and means interconnecting the banking arms of each said pair to retain the effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

19. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, each of said banking arms being articulated to provide for vertical oscillation of one end relative to the other upon an effective oscillation pivotal axis which is substantially horizontal and near to the connection between the corresponding banking arm and the superstructure, resilient means disposed to bridge said oscillation axis and thereby control the articulation of each corresponding banking arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

20. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, each of said banking arms being articulated to embody a hinge support at the end carrying the banking axis and an oscillating arm connected to said support to oscillate vertically relative thereto upon an effective pivotal axis therebetween which is substantially horizontal, resilient means disposed between said hinge support and oscillating arm to control the vertical oscillation of the outer end of the arm relative to the superstructure, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

21. A vehicle comprising a superstructure adapted to counter-bank on turns, at least one pair of transversely spaced wheel carriers constituting independent wheel suspensions for supporting a corresponding part of the superstructure upon the road, each pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, each of said banking arms being articulated to provide for vertical oscillation of one end relative to the other upon an effective oscillation pivotal axis which is substantially horizontal, resilient means disposed to bridge said oscillation axis and thereby control the articulation of each corresponding banking arm, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

22. A vehicle comprising a superstructure adapted to counter-bank on turns, at least one pair of transversely spaced wheel carriers constituting independent wheel suspensions for supporting a corresponding part of the superstructure upon the road, each pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, each of said banking arms being articulated to embody a hinge support at the end carrying the banking axis and an oscillating arm connected to said support to oscillate vertically relative thereto upon an effective pivotal axis therebetween which is substantially horizontal, resilient means disposed between said hinge support and oscillating arm to control the vertical oscillation of the outer end of the arm relative to the superstructure, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to the movement of the superstructure upon said banking arms to guide the superstructure in its rotational banking movement relative to said motion center line.

23. A vehicle comprising a superstructure adapted to counter-bank on turns, a plurality of sets of banking arms disposed to support said superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, and means interconnecting the banking arms of each pair to retain the said effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair, the several motion center lines for the mounting being correlated to provide a common axis of rotation for the superstructure extending longitudinally thereof and substantially above the center of gravity of the superstructure whereby lateral forces acting upon the superstructure from centrifugal action on turns tends to turn said superstructure at said common axis into an inward banking position.

24. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to said motion center line to provide a common axis of rotation for the superstructure extending longitudinally thereof and above the center of gravity of the superstructure whereby lateral forces acting upon the superstructure from centrifugal action on turns tends to turn said superstructure at said common axis into an inward banking position.

25. A vehicle comprising a superstructure adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to said motion center line to provide a common axis of rotation for the superstructure extending longitudinally thereof and substantially above the center of gravity of the superstructure whereby lateral forces acting upon the superstructure from centrifugal action on turns tends to turn said superstructure at said common axis into an inward banking position.

26. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, resilient means disposed to resist turning movement at the banking axes of the arms and thereby retain the superstructure upright on said banking arms when free from lateral forces, resilient means associated with each carrier to provide for relative vertical oscillation between the superstructure and the point of effective road support for the corresponding banking arm, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, additional means connecting the rigid axle structure to the superstructure and disposed to determine the rotational position of the axle structure at all times in cooperation with said banking arms, and a banking support for the remainder of said superstructure correlated to said motion center line to provide a common axis of rotation for the superstructure extending longitudinally thereof and substantially above the center of gravity of the superstructure whereby lateral forces acting upon the superstructure from centrifugal action on turns tends to turn said superstructure at said common axis into an inward banking position.

27. A vehicle comprising a superstructure adapted to counter-bank on turns, at least one pair of transversely spaced wheel carriers constituting independent wheel suspensions for supporting a corresponding part of the superstructure upon the road, each said pair of wheel carriers together with the wheels associated therewith constituting a pair of opposed banking arms extending from the superstructure to the road on opposite sides of the longitudinal center line of the superstructure with the connections for each said pair of banking arms to the superstructure embodying in effect a pivotal banking axis for each arm, means interconnecting the banking arms of each pair to retain the wheels for the corresponding pair in substantially constant spaced relation at the corresponding center points of road contact therefor, resilient means disposed to resist turning movement at the banking axes and thereby retain the superstructure upright on said banking arms when free from lateral forces, resilient means associated with each carrier and disposed to provide for relative vertical oscillation between the superstructure and the point of effective road support for the corresponding banking arm, the plane of each banking arm of a pair of opposed arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and a banking support for the remainder of said superstructure correlated to said motion center line to provide a common axis of rotation for the superstructure extending longitudinally thereof and substantially above the center of gravity of the superstructure whereby lateral forces acting upon the superstructure from centrifugal action on turns tends to turn said superstructure at said common axis into an inward banking position.

28. A vehicle comprising a superstructure adapted to counter-bank on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms for each pair of banking arms embodying in effect a universally movable joint at one corresponding end of each arm and a skew pivotal banking axis at the other end of each arm, and means interconnecting the banking arms of each pair to retain said effective universally movable joints for the corresponding pair in substantially constant spaced relation, the plane of each banking arm of a pair of opposed arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer ends of the arms, the point on each of said motion center lines nearest to the corresponding effective center of mass of the superstructure determining the effective banking leverage therefor, and said points on said motion center lines establishing a common axis of rotation for the superstructure containing the points and which moves laterally during banking of the superstructure and is disposed substantially horizontal and substantially parallel to the longitudinal center line of the superstructure in plan view at all times and substantially above the center of gravity of the superstructure.

29. A vehicle comprising a superstructure adapted to counter-bank on turns in response to lateral movement of the superstructure resulting from lateral forces, and a plurality of pairs of laterally opposed interconnected banking arms supporting said superstructure, each banking arm of a pair of arms extending from the superstructure to the effective road support therefor and being secured to the superstructure to turn relative thereto on a skew pivotal banking axis correlated to the corresponding banking axis for the other banking arm of the pair to provide a banking of the superstructure in a direction opposite to lateral movement of the superstructure, said pairs of banking arms being spaced longitudinally of the superstructure and correlated with each other to provide a common axis of rotation for the superstructure during banking and which axis is substantially parallel to the longitudinal center line of the superstructure at all times and substantially above the center of gravity of the superstructure.

30. A vehicle comprising a superstructure adapted to counter-bank on turns in response to lateral movement of the superstructure resulting from lateral forces, and a plurality of pairs of laterally opposed interconnected banking arms supporting said superstructure and extending from the superstructure to the effective road support therefor, the banking arms of each said pair having each arm secured at one corresponding end thereof to turn on a skew banking line which is correlated to the banking line of the other arm of the pair to provide an angularly movable motion center line for the pair extending above the effective center of mass supported by the arms of the pair, and said pairs of banking arms being spaced longitudinally of the superstructure and correlated with each other to provide a common axis of rotation for the superstructure during banking and which axis is substantially parallel to the longitudinal center line of the superstructure at all times.

31. A vehicle comprising a superstructure adapted to counterbank on turns in response to lateral movement of the superstructure resulting from lateral forces, and a plurality of resilient independent wheel carriers which together with the corresponding wheels associated therewith constitute pairs of laterally opposed interconnected banking arms supporting said superstructure and extending from the superstructure to the effective road support therefor, the banking arms of each pair being separately secured to the superstructure at one corresponding end of each to turn on a banking line for each arm which is correlated to the banking line of the other arm of the pair to provide a motion center line for the pair extending above the effective center of mass supported by the arms of the pair, and said pairs of banking arms being spaced longitudinally of the superstructure and correlated with each other to provide a common axis of rotation for the superstructure during banking and which axis is substantially parallel to the longitudinal center line of the superstructure and substantially above the center of gravity of the superstructure at all times.

32. A vehicle comprising a superstructure adapted to counterbank on turns in response to lateral movement of the superstructure resulting from lateral forces, at least one transverse axle structure, a plurality of pairs of laterally opposed interconnected banking arms supporting said superstructure and extending from the superstructure to the effective road support therefor, said pairs of banking arms being spaced longitudinally of the superstructure with at least one pair connected at the outer ends thereof by universally movable joints to said axle structure, each banking arm of said last named pair being secured at its inner end to the superstructure to turn on a skew banking line which is correlated to the banking line of the other arm of the pair to provide a motion center line for the pair extending above the effective center of mass supported by the arms of the pair and disposed substantially horizontally, and said pairs of banking arms being correlated with each other to provide a common axis of rotation for the superstructure during banking and which axis is substantially parallel to the longitudinal center line of the superstructure and substantially above the center of gravity of the superstructure at all times, and additional means connecting the rigid axle structure to the superstructure and disposed to determine the rotational position of the axle structure at all times in cooperation with said banking arms.

33. A vehicle comprising a superstructure adapted to counter-bank on turns in response to lateral movement of the superstructure resulting from lateral forces, and a plurality of banking arms supporting said superstructure and extending from the superstructure to the effective road support therefor, said banking arms being disposed in pairs of laterally opposed interconnected banking arms spaced longitudinally of the superstructure and correlated with each other to provide a common axis of rotation for the superstructure during banking and which axis is substantially parallel to the longitudinal center line of the superstructure and substantially above the center of gravity of the superstructure at all times, and the banking arms of each said pair being separately secured to the superstructure at one corresponding end of each to turn on a skew banking line disposed at an angle to the horizontal and to the vertical median plane of the superstructure and correlated to the corresponding skew banking line of the other arm of the pair to provide a motion center line for the pair extending above the effective center of mass supported by the arms of the pair, the skew banking lines for any selected pair of banking arms being disposed at substantially the same angle to the horizontal and vertical median planes of the superstructure and extending upwardly toward the vertical median plane.

34. A vehicle comprising a superstructure adapted to counter-bank on turns in response to lateral movement of the superstructure resulting from lateral forces, and a plurality of banking arms supporting said superstructure and extending from the superstructure to the effective road support therefor, said banking arms being disposed in pairs of laterally opposed interconnected banking arms spaced longitudinally of the superstructure and correlated with each other to provide a common axis of rotation for the superstructure during banking and which axis is substantially parallel to the longitudinal center line of the superstructure and substantially above the center of gravity of the superstructure at all times, and the banking arms of each said pair being separately secured to the superstructure at one corresponding end of each to turn on a skew banking line disposed at an angle to the horizontal and to the vertical median plane of the superstructure and correlated to the corresponding skew banking line of the other arm of the pair to provide a motion center line for the pair extending above the effective center of mass supported by the arms of the pair, the skew banking lines for any selected pair of banking arms being disposed at substantially the same angle to the horizontal and vertical median planes of the superstructure and extending upwardly toward the vertical median plane and toward the transverse vertical plane of the outer ends of the arms.

35. A vehicle comprising a superstructure adapted to counter-bank on turns in response to lateral movement of the superstructure resulting from lateral forces, and a plurality of banking arms supporting said superstructure and extending from the superstructure to the effective road support therefor, said banking arms being disposed in pairs of laterally opposed interconnected banking arms spaced longitudinally of the superstructure and correlated with each other to provide a common axis of rotation for the superstructure during banking and which axis is substantially parallel to the longitudinal center line of the superstructure and above the center of gravity thereof at all times, and the banking arms of each said pair being separately secured to the superstructure at one corresponding end of each to turn on a skew banking line disposed at an acute angle substantially less than 45° to the horizontal and to the vertical median plane of the vehicle and correlated to the corresponding skew banking line of the other arm of the pair to provide a motion center line for the pair extending above the effective center of mass supported by the arms of the pair.

36. In a motor vehicle, a superstructure, front and rear wheel supported spindles, generally longitudinally extending paired upper and lower wheel guiding means, pivoted connecting means in intersecting planes between the wheel guiding means and the superstructure whereby the superstructure may assume an angularly inclined position when subjected to lateral forces, resilient means associated with the wheel guiding means to absorb vertical shock to which the wheels are subjected, and resilient means to maintain the superstructure in a substantially upright position until subjected to predetermined lateral forces.

37. In a motor vehicle, a superstructure, a running gear comprising front and rear wheel supported spindles and generally longitudinally extending paired upper and lower pivoted wheel guiding means, hinged connecting means between said guiding means and the superstructure, said connecting means being inclined to intersecting axes of the vehicle to induce the superstructure to assume an angularly inclined position as the vehicle rounds a curve, resilient means associated with the connecting means and operable by oscillating movement of the wheel guiding means about their pivots to counteract the effect of varying pressure in the resilient means as the superstructure assumes an angularly inclined position, guiding means to induce the front and rear wheel guiding means to move laterally in unison as the superstructure subjected to centrifugal force moves into a position inclined towards the inside of the curve, and additional resilient means to urge the superstructure to return to its normal upright position as the centrifugal force is reduced.

38. A vehicle comprising a superstructure, front and rear paired wheels and laterally interconnected wheel supporting means for each pair mounted at opposite sides of the superstructure, hinges connecting each of said wheel supporting means to the superstructure and disposed in spaced relation relative to the vertical axial plane of the wheel, the axis of each of said hinges being upwardly inclined toward the longitudinal axis of the vehicle and toward said vertical axial plane of the wheel with which it is associated, whereby lateral forces acting upon the superstructure will tend to rotate the same about a longitudinal axis to cause it to incline in a direction opposite to that of such force and will shift the center of gravity of the superstructure in the direction of such force.

39. A vehicle comprising a superstructure, front and rear pairs of wheels and laterally interconnected wheel supporting means for each pair mounted at opposite sides of the superstructure, front and rear pairs of hinges connecting said wheel supporting means to the superstructure, the axis of each hinge being inclined both laterally and longitudinally of the vehicle and intersecting the axis of the opposite hinge of the pair in the longitudinal median plane of the vehicle above the level of the hinges, to cause the superstructure to revolve about a longitudinal axis above the center of gravity of the superstructure in response to lateral forces.

40. A vehicle comprising a superstructure and four wheels disposed in front and rear pairs, wheel supporting members, connecting means between the wheel supporting members and the superstructure including banking hinges having their axes inclined angularly toward the vertical axial plane of the corresponding wheels and toward the vertical longitudinal median plane of the vehicle whereby the superstructure may assume an inclined or banked position toward the inside of a curve when subjected to lateral forces as the vehicle rounds the curve, and means for maintaining the wheels of each pair a constant lateral distance apart.

41. A motor vehicle comprising a superstructure and four wheels, front and rear laterally interconnected wheel supporting members, front and rear pairs of laterally spaced hinges interposed between the wheel supporting members and the superstructure, said front and rear pairs of hinges having axes inclined toward the front and rear wheel supported members respectively and intersecting in the longitudinal median plane of the vehicle above the center of gravity of the superstructure whereby the superstructure moves into a position inclined toward the inside of the curve, the wheels remain in a substantially vertical position relative to the road, and the center of gravity moves laterally and downwardly under the influence of lateral force as the vehicle rounds a curve.

42. A vehicle comprising a superstructure and paired front and rear wheels, paired front and rear wheel carriers laterally interconnected and hinged to said superstructure on hinge axes each of which is inclined toward the longitudinal median plane of the vehicle and toward the vertical axial plane of the wheel with which the hinge is associated, and resilient means associated with each wheel carrier urging the same to swing outwardly relative to the superstructure and so related to the superstructure as to be increasingly stressed as its carrier swings inwardly relative to the superstructure.

43. A vehicle comprising a superstructure and paired front and rear wheels, paired front and rear wheel carriers hinged to said superstructure on corresponding hinge axes each of which is inclined toward the longitudinal median plane of the vehicle and toward the vertical axial plane of the wheel with which the hinge is associated, connecting means maintaining the wheels of each pair at a uniform lateral distance from each other, and springs connecting each wheel carrier to the superstructure and so constructed and arranged as to be increasingly stressed as its carrier swings away from its normal position relative to the superstructure.

44. A vehicle comprising a superstructure and paired front and read wheels, a wheel carrier for each of said wheels hinged to the superstructure on a hinge axis which is inclined toward the median plane of the vehicle and toward the vertical axial plane of the wheel with which the carrier is associated, each of the front wheel carriers being connected to the other and comprising upper and lower suspension arms swingable about horizontal axes, each of the rear wheel carriers being connected to the other and comprising a suspension arm swingable about a horizontal axis, and a spring connecting each carrier to the superstructure and so related to the carrier and superstructure as to be increasingly stressed as the carrier swings inwardly about its associated hinge axis.

45. A vehicle comprising a superstructure, adapted to bank inwardly on turns, a plurality of sets of banking arms disposed to support the superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the connection between each banking arm and the superstructure embodying in effect a banking axis fixed relative to the superstructure, means connecting each pair of banking arms to retain the outer ends of the same in substantially constant spaced relation, resilient means providing for vertical oscillation of the outer end of each banking arm substantially independently of pivotal movement at the banking axis, the plane of each banking arm of a pair of opposed arms containing the corresponding banking axis and the center of the effective road contact point therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and resilient means disposed to be actuated by a leverage for each banking arm in correlation to the corresponding motion center line fulcrumed on the banking axis for the arm.

JOACHIM KOLBE.

REFERENCES CITED

The following references are of record in the file of this patent:

UNITED STATES PATENTS

| Number | Name | Date |
|---|---|---|
| 1,647,438 | De Ram | Nov. 1, 1927 |
| 2,076,786 | Kolbe | Apr. 13, 1937 |
| 2,152,938 | Welch | Apr. 4, 1939 |
| 2,162,320 | Siebler | June 13, 1939 |